United States Patent [19]

Landoll

[11] Patent Number: 4,529,523
[45] Date of Patent: Jul. 16, 1985

[54] HYDROPHOBICALLY MODIFIED POLYMERS

[75] Inventor: Leo M. Landoll, Wilmington, Del.

[73] Assignee: Hercules Incorporated, Wilmington, Del.

[21] Appl. No.: 386,472

[22] Filed: Jun. 8, 1982

[51] Int. Cl.$^3$ ............................................... E21B 43/22
[52] U.S. Cl. .................... 252/8.55 D; 166/275
[58] Field of Search ............... 252/8.55 D; 166/274, 166/275

[56] References Cited

U.S. PATENT DOCUMENTS

| | | | |
|---|---|---|---|
| 3,282,337 | 11/1966 | Pye | 166/275 |
| 3,399,725 | 9/1968 | Pye | 166/275 |
| 3,815,679 | 6/1974 | Blanke et al. | 166/275 |
| 4,074,759 | 2/1978 | Bousaid | 166/274 X |
| 4,099,569 | 7/1978 | Bousaid | 166/274 X |
| 4,151,333 | 4/1979 | Lenke et al. | 521/95 |
| 4,228,277 | 10/1980 | Landoll | 536/90 |
| 4,243,802 | 1/1981 | Landoll | 536/91 |
| 4,297,226 | 10/1981 | Hunter | 252/8.55 D |
| 4,304,902 | 12/1981 | Landoll | 528/419 |
| 4,326,969 | 4/1982 | Hunter | 252/8.55 D |
| 4,326,970 | 4/1982 | Cottrell et al. | 252/8.55 D |
| 4,432,881 | 2/1984 | Evani | 252/8.55 R X |

*Primary Examiner*—Herbert B. Guynn
*Assistant Examiner*—Matthew A. Thexton
*Attorney, Agent, or Firm*—Joanne L. Horn

[57] ABSTRACT

The amount of oil which can be recovered from an oil containing subterranean formation is increased by using a water flooding medium. The performance of a water flooding medium is improved where a nonionic, hydrophobically modified, water-soluble polymer, is used as a thickener.

1 Claim, No Drawings

HYDROPHOBICALLY MODIFIED POLYMERS

BACKGROUND OF THE INVENTION

This invention relates to a method for enhanced recovery of oil from a subterranean oil-containing formation. In particular, it relates to improving the performance of a water flooding medium by employing a nonionic, hydrophobically modified water-soluble polymer as the thickener in the medium.

In the early stages of the recovery of oil from subterranean formations pressure from natural water or gas often provides the driving force necessary to displace the oil and drive it towards the production well. If these natural pressures are initially insufficient or when they have become insufficient as a result of oil production, alternative techniques to produce driving forces for the displacement of the subterranean oil towards the production well must be employed. Foremost among these enhanced recovery techniques is water flooding. With water flooding, a medium such as water or, more frequently, brine is injected into the oil containing formation through an injection well. The water flooding medium helps to maintain reservoir pressure and when it comes into contact with oil, to drive it towards the production well.

Even after water flooding, however, a significant amount of oil, as much as two-thirds of the oil initially present in the formation, remains. Major problems which limit the amount of oil which is recovered through water flooding include fingering and low sweep efficiency.

The mobility of a water flooding medium through a porous medium, such as the sandstone which forms many oil containing subterranean formations, is of primary significance in determining how the water flooding medium will behave when confronted with the problems of fingering and low sweep efficiency. Mobility is defined as the ratio of permeability (K) to viscosity, where permeability is given by the equation $$K = (q L/A \Delta p)$$

and is reported in darcies, and where
q is flow rate in cc/sec,
L is length in cm,
A is cross sectional area in cm$^2$,
$\Delta p$ is change in pressure over L in atmospheres.

It can be seen that mobility is the function of both the viscosity of a particular water flooding medium and the permeability of the system in which the water flooding medium is employed.

Where a fluid of low mobility, e.g. oil, is driven by one of a higher mobility, e.g. water, the higher mobility fluid tends to move through the low mobility fluid leaving the low mobility fluid behind. if this phenomenon, referred to as fingering, occurs while oil is being displaced by the water flooding medium, potentially recoverable oil will be left in the formation.

In order to overcome the tendency of the water flooding medium to finger through the oil, the water can be viscosified by the addition of a water-soluble polymer. As the viscosity of the water flooding medium is increased, its mobility is lowered and fingering is decreased. Consequently, oil recovery is enhanced.

Sweep efficiency is the ratio of the volume of rock contacted by the water flooding medium to the total volume of rock subject to invasion by the water flooding medium. Undesirably low sweep efficiency can arise where a water flooding medium having high mobility contacts subterranean areas of high permeability. When this occurs, the water flooding medium simply takes the path of least resistance and does not come into contact with the oil contained in less permeable areas. The sweep efficiency is improved by reducing the mobility of the water flooding medium. Where a water-soluble polymer is added to the water flooding medium, the mobility is decreased. This enables the water flooding medium to come into contact with areas of lower permeability so that it contacts more oil containing areas and consequently, oil recovery is improved.

The usefulness of polymers in controlling the mobility of water flooding medium can be ascertained by evaluating the water flooding medium in light of two related parameters. The first is resistance factor (hereinafter referred to as RF). RF is defined as the ratio of the mobility of a water flooding medium without polymer, to the mobility of the water flooding medium with polymer added. The second parameter is retained resistance factor (hereinafter referred to as RRF). RRF is the ratio of the mobility of the water flooding medium without polymer, measured before a water flooding medium with polymer added has been passed through a test core, to the mobility of the water flooding medium without polymer measured after a water flooding medium with polymer added has been passed through. Generally, high RF and low RRF values are indicative of polymers which are useful in water flooding media. However, polymers with a high RRF value have advantages in other enhanced oil recovery applications such as sealing off thief zones. Thief zones are areas in the subterranean formation which have high permeability and allow flooding chemicals to escape from the oil production zone.

Another problem limiting the recovery possible with water flooding is that because the water flooding medium is immiscible with oil, it is ineffective in displacing oil which adheres to the rock in the formation. This problem has been dealt with by injecting a surfactant. When injected into the formation surfactants release the entrapped oil through miscible displacement. Unfortunately the use of surfactants is expensive.

Other problems which affect the efficiency of oil recovery involve the durability of the polymer in the polymer-water flooding medium: The polymer must be tolerant to the salts present in the brine used as the water flooding medium or in the formation; otherwise the polymer will precipitate out of solution. The polymer must not be degraded by the shear forces which arise as the polymer is injected and forced through the formation. The polymer must have reasonable thermal and biological stability because it may take upwards of two years from the time the polymer-water flooding medium is injected until it makes its way to the production well. Furthermore, for polymer-water flooding to be economical, the polymer must be effective at low concentrations.

Most known water-soluble polymers have been evaluated in light of these problems. Poly(acrylamide), xanthan gum and hydroxyethyl cellulose are the currently preferred polymers. However, poly(acrylamide) is quite sensitive to shear forces and also to salts, particularly divalent metal salts. Xanthan gum is very expensive and can cause injectibility problems unless it is highly purified. Hydroxyethyl cellulose while the least expensive of these three is also the least efficient thickener. Moreover, none of these polymers exhibits the surface activity necessary to give rise to miscible displacement.

These problems are successfully countered by the method of this invention wherein a water flooding medium containing a hydrophobically modified, water-soluble polymer is injected into the oil-containing formation.

SUMMARY OF THE INVENTION

The invention relates to a method of recovering oil from a subterranean oil-containing formation. The method comprises employing a water flooding medium thickened by a nonionic, hydrophobically modified, water-soluble polymer. The polymer backbone may be any nonionic, water-soluble polymer including poly(acrylamide), a cellulose ether, poly(ethylene oxide), a natural polysaccharide gum and poly(vinyl alcohol). The polymer backbone is modified by the incorporation of small amounts of long chain alkyl groups. The preferred polymer is hydrophobically modified hydroxyethyl cellulose where the alkyl chain modifier is from about 8 to about 25 carbons in length. The concentration of hydrophobically modified water-soluble polymer in the water flooding medium is from about 0.01 to about 2.0%, preferably from about 0.1 to about 0.5% by weight of the water flooding medium. If desired, the polymer-water flooding medium may also contain a compatible surfactant.

DETAILED DESCRIPTION OF THE INVENTION

The method in accordance with the invention is an improved technique for the water flooding of subterranean oil-containing formations. An improvement in oil recovery arises because of the enhanced efficiency in terms of low mobility and a degree of surface activity of the water flooding medium which contains a nonionic hydrophobically modified water-soluble polymer.

The backbone of the polymer may be any nonionic, water-soluble polymer. The nonionic character of the backbone is important in promoting salt tolerance. Suitable nonionic, water-soluble polymers include poly(acrylamide); cellulose ethers, such as hydroxyethyl cellulose; poly(ethylene oxide); natural polysaccharide gums, such as guar gum; and poly(vinyl alcohol).

The backbone of the nonionic polymer is modified by the incorporation of small amounts of alkyl moieties of from about 8 to about 25 carbons. Suitable cellulose ethers are disclosed in U.S. Pat. No. 4,228,277. These ethers have sufficient nonionic substitution, such as methyl, hydroxyethyl or hydroxypropyl substitution, to render them water-soluble. The cellulose ethers are modified with alkyl chains which are preferably from about 8 to about 25 carbons in length. The modifiers are present in an amount from about 0.2% by weight to the amount which makes them less than 1% soluble in water. Suitable poly(ethylene oxides), copolymers of about 96 to 99.9% by weight ethylene oxide and about 4 to 0.1% by weight epoxy-n-alkanes, where the alkane contains 12 to 25 carbon atoms, are disclosed in U.S. Pat. No. 4,304,902. Suitable poly(acrylamides), those comprised of about 95 to about 99.5% by weight of acrylamide and about 5 to 0.5% of a vinyl monomer containing a 12 to 25 carbon alkyl moiety are disclosed in U.S. Pat. No. 4,151,333.

In general, the alkyl modifier contains from about 8 to about 25 carbons, preferably from about 16 to about 25 carbons. As the number of carbons of the alkyl modifier increases the viscosifying power of the polymer increases and the mobility of the water flooding medium decreases. The alkyl modifiers constitute from about 0.20 to about 2.0% by weight of the polymer. It is an advantage of this invention that the RRF values of a water flooding medium can be significantly altered by varying the amount of hydrophobic modification of the nonionic polymer. For instance, one water flooding medium which incorporated a water-soluble polymer having a modification level of 0.4% had an RRF of 5 whereas an analogous water flooding medium which incorporated a water-soluble polymer with a modification level of 0.9% resulted in a RRF of 23. This amounts to nearly five fold increase in RRF.

Operable polymers have molecular weights of about 50,000 to 1,000,000. Preferable molecular weights are from about 150,000 to about 800,000. The relatively low molecular weight of the hydrophobically modified water-soluble polymers minimizes the problem of shear induced degradation. Another advantage of the hydrophobically modified polymers encompassed by the invention is that at high shear they exhibit low viscosity, which provides for good injectability, while at low shear they exhibit high viscosity which gives rise to their effectiveness once injected into the subterranean formation.

Water flooding media are known in the art. They include water and aqueous solutions such as surface water, well water, rain water, city water, treated waste water, and suitable oil field brines. The concentration of polymer in the polymer-water flooding medium is from about 0.01 to 2.0%, preferably from about 0.1 to 0.5%, by weight.

Nonionic, hydrophobically modified, water-soluble polymers specified herein are especially well suited for use in polymer-water flooding media because they possess surface activity not exhibited by the polymers heretofore employed to viscosity water flooding media. This surface activity is manifested by the formation of emulsions and can be seen where solutions made from this polymer are mixed with either crude or refined oil. Such surface activity is advantageous to the polymer-water flooding medium in that it promotes the miscible displacement of oil adhering to the subterranean rock. In some cases the surface activity of the water flooding medium is great enough that treatment with a separate surfactant is not necessary. In other cases where the surface activity of the water-soluble polymer is not sufficient and the use of a surfactant is desired, less surfactant will be necessary than in situations where the water-soluble polymer has no surface activity.

The surface activity of the hydrophobically modified water-soluble polymer results in significant compatibility between the polymer and many surfactants. In many situations this compatibility will eliminate the need to inject the surfactant in a separate step.

It will be appreciated that the particular nature of subterranean formations varies widely. However, the precise conditions to be employed at a given formation can be readily determined by one skilled in the art.

The following examples are given as further illustrations of the method of the invention and are not limitations thereof. All proportions are based on weight unless clearly indicated otherwise.

EXAMPLES 1 THROUGH 3

The polymers in examples 1 through 3 were evaluated using standard porous media: fired (clay stabilized) Berea sandstone cores. The mobility, RF and RRF were obtained for each example. The solution used in each example contained 1000 ppm of a hydroxyethyl cellulose (hereinafter referred to as HEC) having a molar substitution (hereinafter referred to as MS) of about 2.5. MS is a term well known in the art. Hydroxyethyl (MS) is the average number of moles of hydroxyethyl incorporated per anhydroglucose unit. The HEC used in each example contained a different amount n-hexadecyl groups for hydrophobic modification. In example 1 the HEC had 0.4% hydrophobic substitution, by weight, based on the weight of the hydroxyethyl cellulose. In example 2, there was 0.9% hydrophobic substitution. Example 3 served as the control, having no hydrophobic substitution whatsoever. The solution used in each example contained 1000 ppm HEC in 2% NaCl and 0.2% $CaCl_2$ brine. The solutions were filtered through Whatman #41 filter paper and then filtered again through Whatman #1 filter paper before being placed in a sandstone core. Then the pressure of each solution was measured across a 4" core having a diameter of 1". The solutions flowed at a linear velocity of 11' per day. The results reported are equilibrium values obtained only after more than 30 pore volumes of solution containing the hydrophobically modified hydroxyethyl cellulose had flowed through the core.

The results in Table 1 clearly demonstrate the effectiveness of hydrophobically modified HEC (hereinafter referred to as HMHEC) as a mobility control agent having high RF relative to existing water-soluble polymers. The results also demonstrate that RRF can be varied over a broad range simply by varying the amount of hydrophobic modification.

TABLE 1

| Example | % Hydrophobic Substitution | Permeability | RF | RRF |
|---|---|---|---|---|
|  | 0.4 | 227 | 63 | 5 |
| 2 | 0.9 | 159 | 75 | 23 |
| 3 | 0 | 670 | 1.4 | 1.0 |

EXAMPLES 4 THROUGH 10

In examples 4 through 10, solutions containing 1000 ppm of the polymer listed in Table 2, in 1.5% NaCl, were mixed with an equal volume of oil or in the case of the solutions made HEC or polyacrylamides an equal volume of micellar fluid and one-half that volume of oil. Each mixture was shaken and the phase behavior observed after twelve hours. The results are described in Table 2. These data illustrate that solutions of HMHEC with no surfactant added (examples 4 and 10) exhibit phase behavior with oil similar to that exhibited by solutions of other polymers in combination with other surfactants, (examples 6, 7, 8, and 9) and better than HEC alone (example 5).

TABLE 2

| Ex-ample | Composition | Phase Appearance after 12 hrs. |||
|---|---|---|---|---|
| | | Upper | Lower | Middle |
| 4 | Isopar M[1]<br>HMHEC[2] | white foamy emulsion | hazy | none |
| 5 | Isopar M[1] | clear | clear | none |
| 6 | HEC (Union Carbide Co. Cellosize QP 100 MH)<br>Isopar M[1]<br>Micellar Fluid A[3] | no emulsion<br>white foamy emulsion | hazy | none |
| 7 | HEC (Union Carbide Co. Cellosize QP 100 MH)<br>Isopar M[1]<br>Micellar Fluid A[3]<br>polyacrylamide (Dow Pusher 700) | emulsion<br>white foamy emulsion | hazy | none |
| 8 | Isopar M[1]<br>Micellar Fluid B[4]<br>HEC (Union Carbide Co. Cellosize QP 100 MH) | clear | clear | hazy yellow emulsion |
| 9 | Isopar M[1]<br>Micellar Fluid B[4]<br>polyacrylamide (Dow Pusher 700) | clear | clear | hazy yellow emulsion |
| 10 | Isopar M[1]<br>HMHEC[2]<br>n-heptanol[5] | hazy | hazy | white emulsion |

[1]Isopar M is a refined hydrocarbon mixture boiling at about 180–200° C.
[2]Hydrophobically modified HEC having an MS of 2.5 and having n-hexadecyl groups creating a hydrophobic substitution of 0.9% by weight of the HEC.
[3]3% Steppantan H 100 petroleum sulfonate, manufactured by Stepan Chemical Co., Northfield, IL 60093, plus 3% isopropanol in distilled water.
[4]5% Witco TRS 10410 petroleum sulfonate manufactured by Witco Chemical Corporation, NY, NY 10017, plus 3% isopropanol in distilled water.
[5]Volume of n-heptanol added was equal to 1/10 the volume of the HMHEC solution or the oil.

EXAMPLES 11 THROUGH 13

In examples 11 through 13, the surface activity of HEC which was hydrophobically modified by n-hexadecyl chains is further illustrated by the formation of emulsions when equal volumes of polymer solution (1000 ppm polymer in 1.5% NaCl) are mixed with a variety of crude oils. The HEC had an MS of about 2.5 and hydrophobic substitution of 0.9 based on the weight of the HEC. The phase appearance after 12 hrs. is shown in Table 3.

TABLE 3

| Example | Composition | Phase Appearance after 12 hrs. |||
|---|---|---|---|---|
| | | Upper | Lower | Middle |
| 11 | 50 ml HMHEC solution + 50 ml NBU-crude[1] | foamy emulsion | hazy | none |
| 12 | 50 ml HMHEC solution + 50 ml E. L. Cox-crude[2] | foamy emulsion | hazy | none |
| 13 | 50 ml HMHEC solution + 50 ml Cox-Doughorty[3] | foamy emulsion | hazy | none |

[1]Crude oil with a density of 39° API. °API = [141.5/(specific gravity at 60° F.)] − 131.5.
[2]Crude oil with a density of 39.1° API.
[3]Crude oil with a density of 23.7° API.

EXAMPLES 14 THROUGH 19

In examples 14 through 19, the interfacial tension of 0.5% aqueous solutions of n-hexadecyl hydrophobically modified polymers against Isopar M, a refined hydrocarbon mixture boiling within a range of 180°–200° C., were compared with the interfacial tensions of 0.5% aqueous solutions of unmodified polymer against Isopar M. The measurements were made using a spinning drop tensiometer manufactured by EOR, Inc. The lowering of interfacial tension is indicative of surface activity.

TABLE 4

| Example | Polymer | Percent Hydrophobic Substitution | Interfacial Tension vs. Isopar M (dynes/cm) |
|---|---|---|---|
| 14 | None | — | 42 |
| 15 | Hydroxyethylcellulose | 0 | 31 |
| 16 | HMHEC | 1.0 | 24 |
| 17 | Poly(vinyl alcohol) | 0 | 31 |
| 18 | HM-poly(vinyl alcohol) | 1.3 | 23 |
| 19 | HM-poly(ethylene oxide) | 1.1 | 15 |

I claim:

1. In the method of enhancing the recovery of oil from an oil-containing formation by means of a polymer thickened water flooding medium, the improvement comprising the thickener for said water flooding medium being from about 0.1 to about 2.0%, by weight of the water flooding medium, of a nonionic water-soluble copolymer of ethylene oxide and an epoxy-n-alkane, where the alkane moiety is present in the copolymer in an amount from about 0.2 to about 2.0%, by weight of the copolymer, and contains 8 to 25 carbon atoms, and where the copolymer has a molecular weight of 50,000 to 1,000,000.

* * * * *